United States Patent
Helfman

(10) Patent No.: US 11,036,470 B2
(45) Date of Patent: Jun. 15, 2021

(54) METHOD FOR ANALYZING THE PERFORMANCE OF MULTIPLE TEST INSTRUMENTS MEASURING THE SAME TYPE OF PART

(71) Applicant: Keysight Technologies, Inc., Minneapolis, MN (US)

(72) Inventor: Jonathan Helfman, Half Moon Bay, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 303 days.

(21) Appl. No.: 15/798,345

(22) Filed: Oct. 30, 2017

(65) Prior Publication Data
US 2019/0129691 A1 May 2, 2019

(51) Int. Cl.
*G06F 16/23* (2019.01)
*G06F 7/08* (2006.01)

(52) U.S. Cl.
CPC ............ *G06F 7/08* (2013.01); *G06F 16/2379* (2019.01)

(58) Field of Classification Search
None
See application file for complete search history.

(56) References Cited

U.S. PATENT DOCUMENTS

| | | | |
|---|---|---|---|
| 2004/0006447 A1* | 1/2004 | Gorin | G01R 31/31707 702/181 |
| 2009/0143999 A1* | 6/2009 | Karthikeyan | G01R 35/005 702/58 |
| 2015/0341246 A1* | 11/2015 | Boubez | H04L 43/0876 709/224 |

OTHER PUBLICATIONS

Should Young Students learn About Box Plots? written by Bakker, Curricular Development in Statistics Education, Sweden, 2004: Arthur Bakker, Rolf Biehler, Cliff Konold, https://iase-web.org/documents/papers/rt2004/4.2_Bakker_etal.pdf (Year: 2004).*

* cited by examiner

*Primary Examiner* — Hau H Hoang

(57) ABSTRACT

A method for operating a data processing system to analyze data sets for groupings and a computer readable medium having instructions to execute that method are disclosed. The method includes causing the data processing system to receive a plurality of data sets, each data set including a plurality of values characterized by a statistical distribution and a label. The method also includes causing the data processing system to compute a plurality of statistical parameters for each of the plurality of data sets, to generate a data set vector having components equal to the plurality of statistical parameters for each of the plurality of data sets, to assign each data set to a cluster based on the data set vectors using a clustering algorithm, and to generate a display of the statistical distributions as a function of the labels in which the statistical distributions belonging to the same cluster are grouped together.

12 Claims, 5 Drawing Sheets

METHOD FOR ANALYZING THE PERFORMANCE OF MULTIPLE TEST INSTRUMENTS MEASURING THE SAME TYPE OF PART

BACKGROUND OF THE INVENTION

Consider a production line for a particular part that is tested by instruments that measure one or more signals from the part. The part testing may involve a plurality of the same type of test instrument to speed the testing process. In addition, the same part may be tested multiple times. For example, the part may have been found to be defective in the first test and routed to a repair station. The repaired part is then tested again. In an ideal world, all of the test instruments would measure the same values for any given part. However, in the real world, the set of measurements provided by any test instrument over a number of ideally identical parts will have some statistical distribution. Similarly, even good parts will display some variation. When the number of test instruments is large, identifying malfunctioning test instruments presents challenges, particularly in the case of small errors in the output values which vary from part to part, and hence, are hidden in the statistical noise. Finally, the test instruments may vary due to the exact model and date at which the instrument is placed in service. Accordingly, examining the production line in the face of these variations presents significant challenges.

SUMMARY

The present invention includes a method for operating a data processing system to analyze data sets for groupings and a computer readable medium having instructions that cause a data processing system to execute that method. The method includes causing the data processing system to receive a plurality of data sets, each data set including a plurality of values characterized by a statistical distribution and a label. The method also includes causing the data processing system to compute a plurality of statistical parameters for each of the plurality of data sets, to generate a data set vector having components equal to the plurality of statistical parameters for each of the plurality of data sets, to assign each data set to a cluster based on the data set vectors using a clustering algorithm, and to generate a display of the statistical distributions as a function of the labels in which the statistical distributions belonging to the same cluster are grouped together.

In one aspect of the invention, the display includes a graph of a symbol associated with statistical parameters as a function of the labels, the symbol located at a median value or average value of the data set values for that label.

In another aspect, the data sets are further ordered within each cluster by the median value or the average value.

In another aspect, each of the data sets includes a plurality of measurements of a first physical quantity measured by a first test probe associated with that one of a plurality of instruments, each label corresponding to one of the test instruments.

In another aspect, the display includes a graph of a symbol associated with the statistical parameters as a function of the instrument ID, the symbol located at a median value or average value of the measurements made by that instrument.

In another aspect, the symbol includes a boxplot.

In another aspect, each of the instruments includes a second test probe and provides a measurement of a second physical quantity by the second test probe, and wherein the data processing system generates a plurality of statistical parameters that characterize a statistical distribution for a set of measurements corresponding to each of the plurality of instruments and the second test probe associated with that instrument and the instrument vectors further includes the second plurality of statistical parameters.

DETAILED DESCRIPTION

Figure 1:
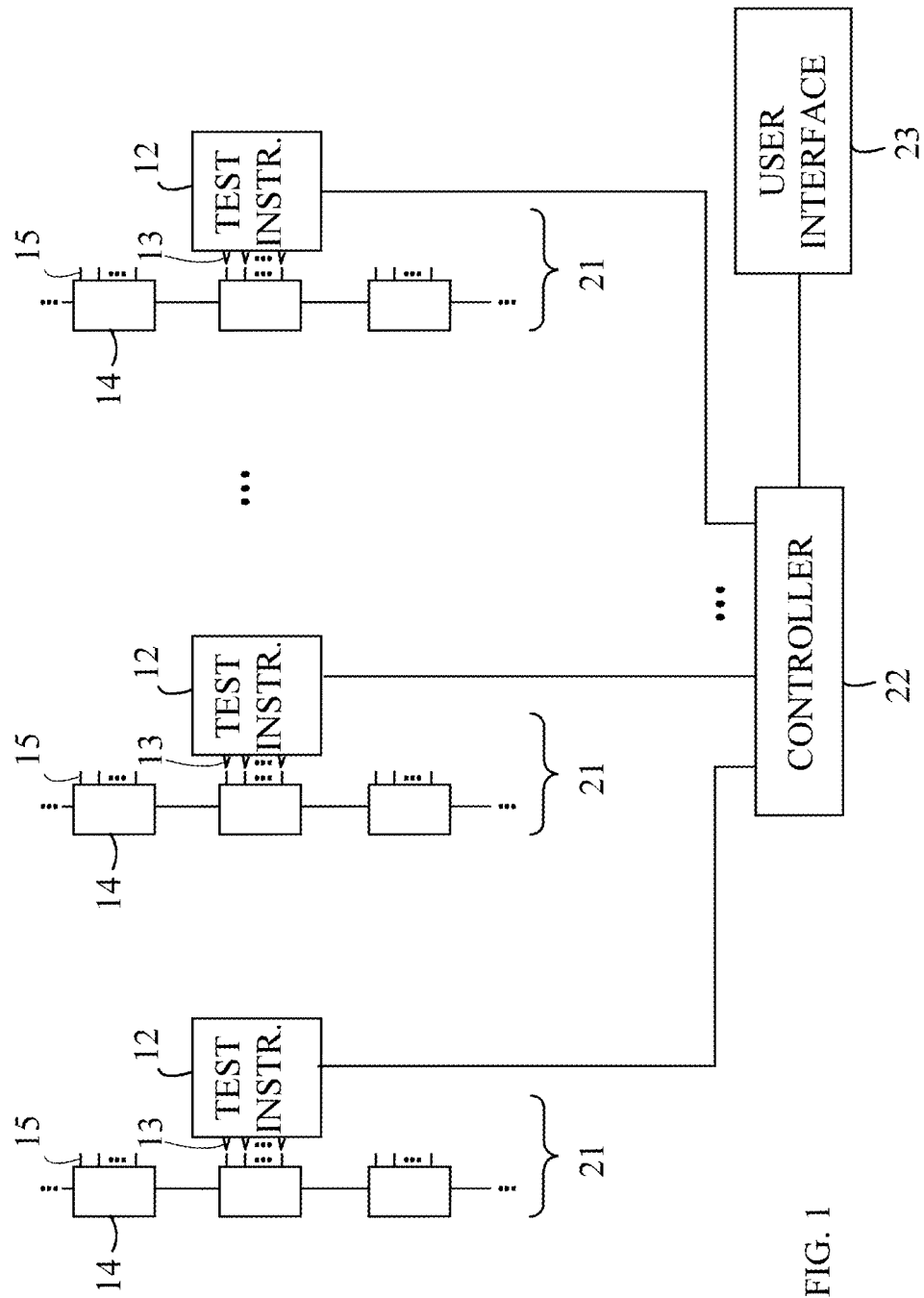
FIG. 1 illustrates a production line in which the present invention can be advantageously included.

The manner in which the present invention provides its advantages can be more easily understood with reference to a simple example. Refer now to FIG. 1, which illustrates a production line in which the present invention can be advantageously included. The production line generates integrated circuit boards 14 in which the final boards are tested by a plurality of test instruments 12 to increase the throughput of the testing phase of the production. In the present example, the production line is also broken into a plurality of sub-production lines 21 to further increase the rate of production of the integrated circuit boards. For the purposes of this example, each instrument measures the same set of $N_t$ test points 15 on the boards tested by that instrument using $N_t$ test probes 13, one test probe 13 corresponding to one of the test points 15. It is assumed that each instrument reports its measurements to a controller 22 that, among other things, stores the raw test results in a table or similar structure and provides a user interface 23 for displaying the data and graphs needed by a user to better understand the operation of the test instruments. Each line of the table has $N_t+1$ entries, one for the instrument ID and $N_t$ for the measurements. This table will be referred to as the raw measurements table in the following discussion. The individual measurements in each column are the data values obtained by a particular test probe and instrument. The column defines the test probe, the instrument ID identifies the instrument making the measurement. The set of measurements made by any given instrument and one of its test probes over a number of boards will be referred to as the measurement set for that instrument/test probe (MSITP).

Figure 2:
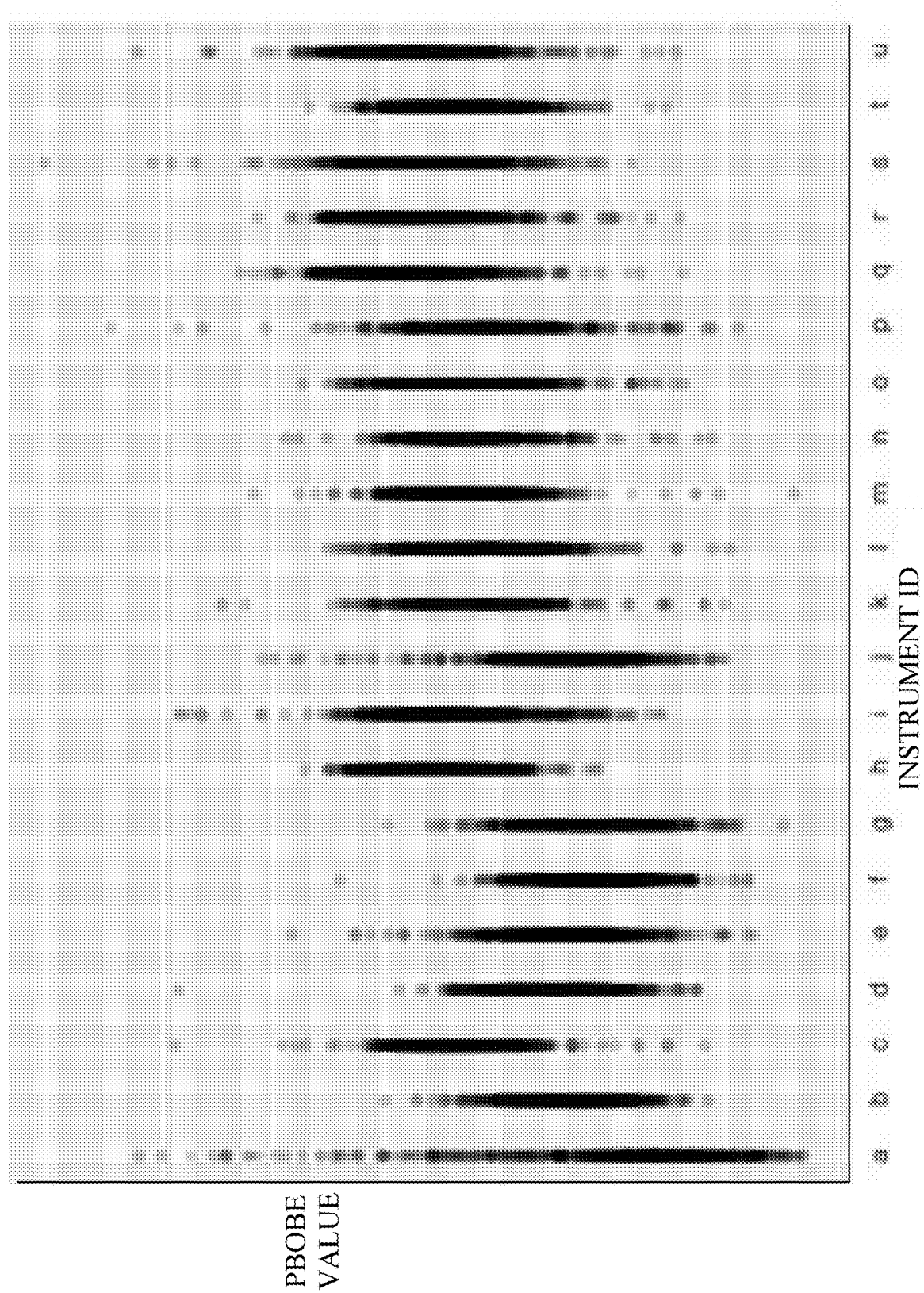
FIG. 2 illustrates a number of one-dimensional scatter plots for a particular test probe on each instrument ordered by the instrument ID.

For each test instrument, a scatter plot can be generated for each MSITP. Refer now to FIG. 2, which illustrates a number of one-dimensional scatter plots for a particular test probe on each instrument ordered by the instrument ID. MSITP for any given instrument is characterized by a statistical distribution. In one aspect of the invention, one or more statistical parameters are computed for each MSITP. For the purposes of this discussion, a statistical parameter is defined to be any parameter derived from the difference of the median or average of the individual measurements and the individual measurements. Examples of such statistical parameters based on the average of the data values include a function of the standard deviation of the data values of the scatter plot, a function of the average value of the absolute difference of the individual data values and the average value. The average value or median of the measurements is also included in the statistical parameters.

Statistical parameters can also be based on the median value of the data values and other values related to the median value of the distribution. These summary statistics can be displayed with a relatively simple symbol that presents five values. To compute these values, the values of the set are ordered by their values. The first value of the summary statistics is the median of the MSITP. The remaining quantities are the quartiles and the outliers of the distribution. Quartiles are calculated by dividing a sorted list of the distribution values into four substantially equal-length parts. The quantity in the middle of the list (or a value interpolated between the two middle values of the list) will be referred to as 'Q2', or the 'median'. The first quartile, 'Q1' divides the first half of the list into two equal parts, while the third quartile, 'Q3', divides the second half of the list in two equal parts. The middle half of the list, the part between Q1 and Q3, is called the interquartile range, or 'IQR'. The IQR is also equal to the values between the 25th and 75th percentiles of the data. The IQR is used to find outliers in the set. Outliers are typically defined as values that fall below Q1−1.5 IQR or above Q3+1.5 IQR.

Figure 3:
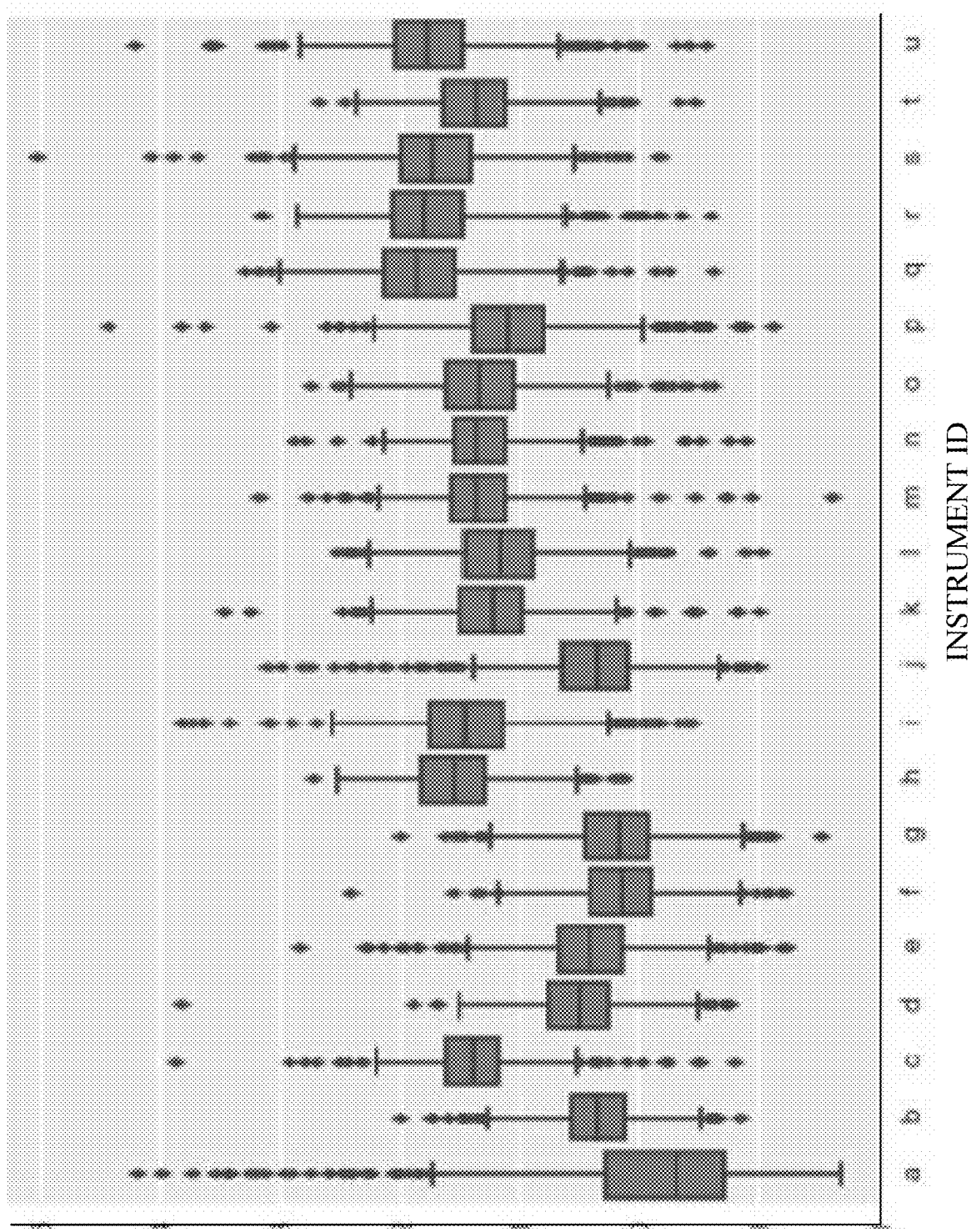
FIG. 3 illustrates the scatter plots of FIG. 2, with the individual scatter plots overlaid boxplots.

The symbol that represents these summary statistics has a box with the Q1 and Q3 points represented by horizontal lines. Q1 is represented by a horizontal line within the box. The outliers are shown by small bars connected to the box by vertical lines. Exemplary symbols will be shown in the figures that follow. This symbol will be referred to as a boxplot in the following discussion. FIG. 3 illustrates the scatter plots of FIG. 2, with the individual scatter plots overlaid boxplots. It should be noted that even with the boxplots overlying the individual scatter plots, it is still difficult to discern whether the instruments have a systematic grouping of some form.

The present invention groups the results for any given test probe by finding clusters in the individual instrument data across all test points and then displaying the results for that test probe re-ordered such that instrument results for that test probe are grouped together in a display of the results of that test probe. To cluster the test probe data, a vector is constructed for each instrument based on the statistical parameters that represent the statistical distributions measured by the instruments for each test probe.

The manner in which the clustering is achieved can be more easily understood with reference to one exemplary embodiment of the present invention. For each instrument/test probe, the statistical distribution of the measurements made by that instrument/test probe is reduced to a plurality of statistical parameters such as those in the boxplot. That is, the parameters Q1 through Q5 are computed for each instrument/test probe. Accordingly, a clustering vector having $5*N_t$ components is generated for each instrument. Each of the resulting vectors defines a probe in a $5N_t$ dimension space. In one aspect of the invention, the data processing system determines the location and bounds of clusters of these points. Ideally, if all of the instruments are performing correctly, and there is no systematic variations among the parts being measured or boards, there would only be one such cluster. However, in practice, there are multiple clusters or a large cluster with individual outliers, i.e., a cluster with only one member. By ordering the data based on the clusters, a user can more easily understand the raw data table and gain insight into the production line.

Algorithms for identifying clusters in such a space are known in the art, and hence, will not be discussed in detail here. For example, one class of these algorithms defines a density function that represents the number of points per unit volume in the space and then attempts to find peaks in that density function. Each peak represents one cluster. The points surrounding any given peak are then defined to belong to the cluster assigned to the peak. Other examples of clustering algorithms utilize multi-dimensional averaging, such as K-Means, or 'ensemble' methods, which combine multiple clustering techniques.

Figure 4:
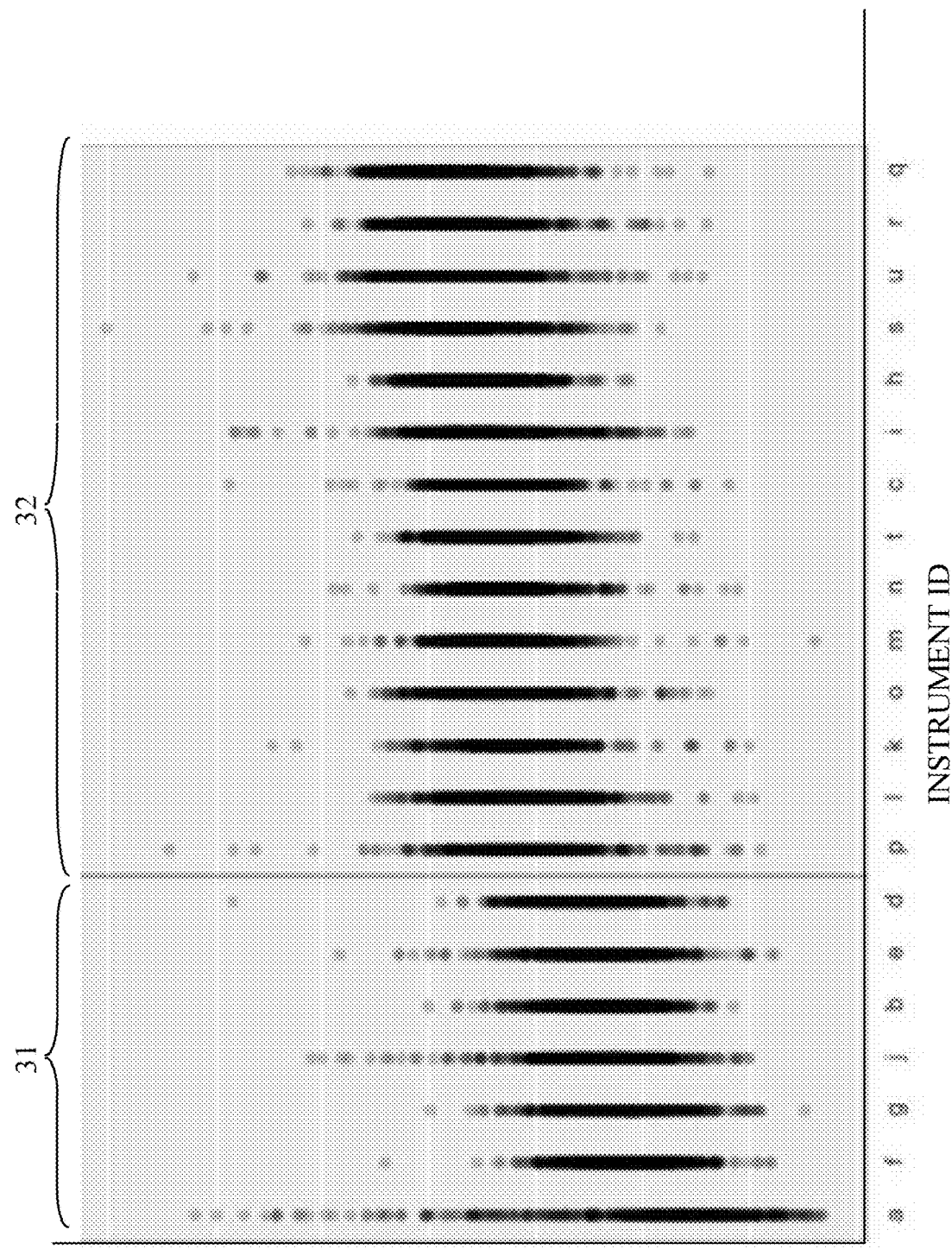
FIG. 4 illustrates the data shown in FIG. 3 after reordering the scatter plots such that the data from instruments that are grouped together are displayed adjacent to each other.

Once the instruments have been assigned to clusters, the data from the raw data table can be presented in a manner that allows the differences between the instruments/circuit boards in each cluster to be more readily understood by a human operator. Refer now to FIG. 4, which illustrates the data shown in FIG. 3 after reordering the scatter plots such that the data from instruments that are grouped together are displayed adjacent to each other. The vertical dividing line separates the two clusters found in the clustering. It should be noted that this plot only shows data for one test probe. Similar plots can be generated for other test points.

Figure 5:
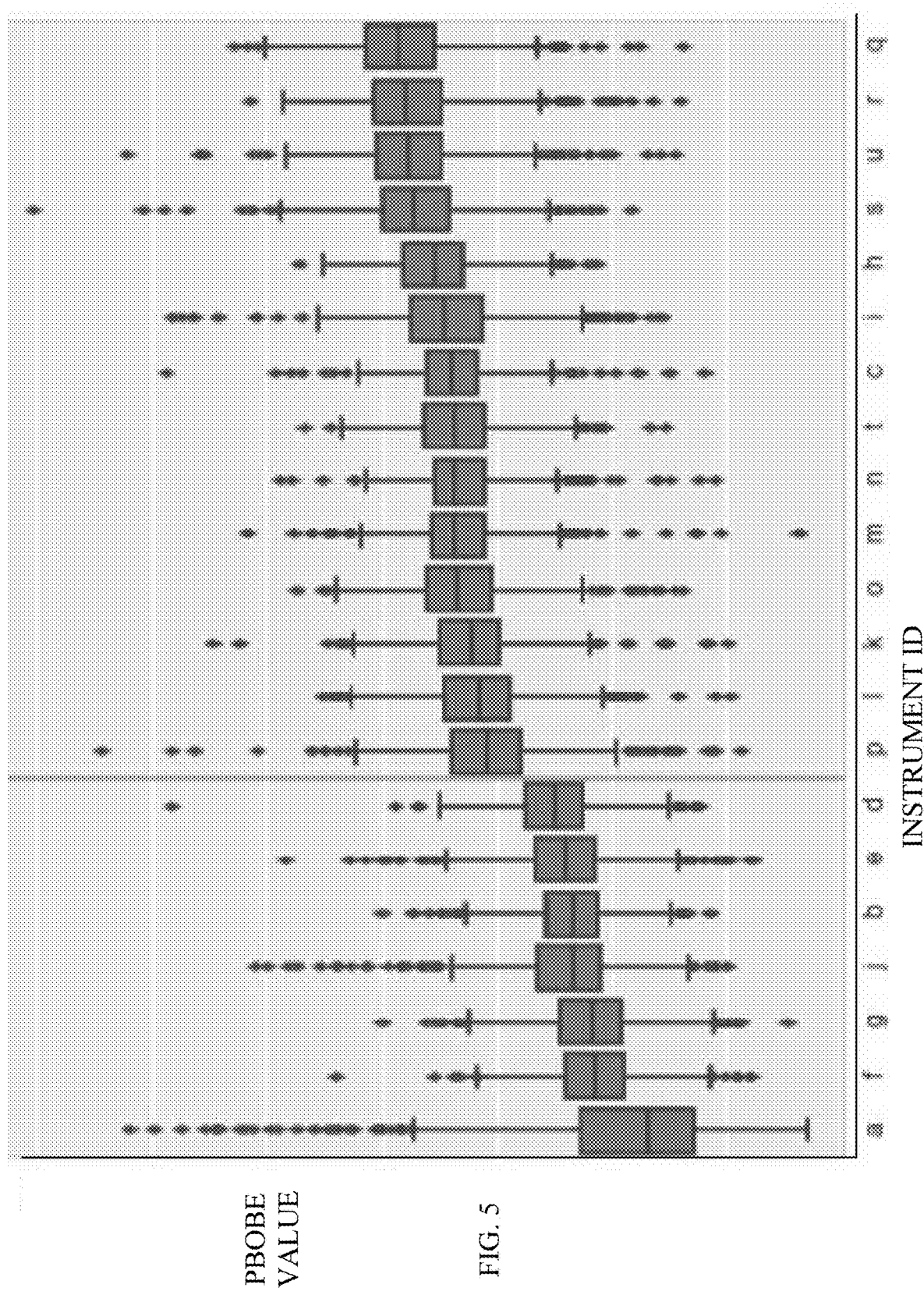
FIG. 5 illustrates the data shown in FIG. 4 with the boxplot symbols plotted over the data.

While the data shown in FIG. 4 is useful in viewing the raw data, displays that include the statistical parameters can provide greater insight into the data. Refer now to FIG. 5, which illustrates the data shown in FIG. 4 with the boxplot symbols plotted over the data. Those elements of the raw data that lie under the symbols are not shown. The boxplot symbols clearly show the clustered nature of the data. The remaining outliers are shown as individual points. The combined data display also provides insight into the differences between the clusters through the inclusion of the outliers. In particular, the data in cluster 31 is characterized by significantly more high outliers than the data in cluster 32 indicating that the statistical distributions have "tails" that extend to higher data values. Similarly, the data in cluster 32 has significantly more low outliers indicating that the statistical distributions have tails that extend to lower data values.

Clusters can be the result of variation in the instruments or variation in the components of the boards being tested. If all of the test probe clustering diagrams show the same clusters, then the clustering is most likely the result of variation in the instruments. However, if different test probe clustering diagrams show different clusters, the clustering is more likely the result of variation in the board components. For example, one test could measure the capacitance of a particular capacitor on the board being tested. If different boards have capacitors from different batches of capacitors, the resulting clustering could be the result of systematic differences in capacitors.

In the above-described embodiments, the clustering vectors utilized the same statistical parameters for each test probe. However, embodiments in which different statistical parameters are used for different test points can also be constructed. The only requirement of the clustering algorithms is that the same statistical parameters are used for each instrument/test probe. Since each test probe measures a different parameter on the circuit boards, statistical parameters that better characterize the resulting distributions are preferred. For example, the first test probe data could be characterized by the boxplot parameters and the second test probe data could be characterized by the median and standard deviation of the statistical distributions for the second test probe data.

Clustering the measurements based on the statistical parameters rather than the raw data allows the present invention to be applied to data sets in which different probes have different numbers of data points. That is, a measurement may be missing from the data set corresponding to one of the probes. In addition, using the statistical parameters in place of the raw data significantly reduces the computational workload of performing the cluster analysis.

In the above-described examples, the clustering vectors included components from the statistical parameters of all of the test probes. However, embodiments in which the data is clustered on a sub-set of the test probes can also be constructed. For example the data could be clustered based on cluster vectors that only have statistical parameters derived from one of the test probes.

The data processing system that performs the clustering and display functions can be the controller that collects the data from the various instruments or a separate data processing system that receives the collected data and performs the analysis in response to commands from a user through the user interface associated with that data processing system.

The above-described embodiments of the present invention have been directed to analyzing data sets generated by physical instruments having one or more test probes for measuring physical quantities. However, the method of the present invention can be applied to other data sets to detect and display groupings in those data sets. In the more general case, the data processing system receives a plurality of data sets, each data set comprising a plurality of values characterized by a statistical distribution and a label. The data processing system computes a plurality of statistical parameters for each of the plurality of data sets. A data set vector having components equal to the plurality of statistical parameters for each of said plurality of data sets is then generated, and the data set vectors are clustered using a clustering algorithm. A display of the statistical distributions as a function of the labels is then generated in which data sets belonging to the same cluster are grouped together. The display can also include a graph of a symbol associated with the statistical parameters as a function of said labels. The symbol is preferably located at a median value or average value of the data set values for that label. Within a given cluster, the statistical distributions and/or symbols can be ordered by one of the statistical parameters such as the median or average value of the values in that data set.

The present invention also includes a computer readable medium that stores instructions that cause a data processing system to execute the method of the present invention. A computer readable medium is defined to be any medium that constitutes patentable subject matter under 35 U.S.C. 101 and excludes any medium that does not constitute patentable subject matter under 35 U.S.C. 101. Examples of patentable media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to analyze data sets for groupings, said method comprising causing said data processing system to:
   receive a plurality of data sets, each data set comprising a plurality of measurements of a first physical quantity made by a corresponding test instrument, and a label identifying said test instrument, and being characterized by a statistical distribution;
   compute a plurality of statistical parameters for each of said plurality of data sets;
   generate a data set vector having components equal to said plurality of statistical parameters for each of said plurality of data sets;
   assign each data set to a cluster based on said data set vectors using a clustering algorithm; and
   generate a graph of said statistical distributions as a function of said labels on a display of said data processing system that is viewed by user to determine if systematic variations in said data sets are the result of variations in said test instruments or variations in components measured by said test instruments in which said statistical distributions belonging to the same cluster are grouped together along a first axis of said graph with said labels being shown on said first axis and said statistical distributions are displayed on a second axis of said graph, wherein each statistical distribution comprises a one-dimensional scatter plot of said measurement values of said dataset corresponding to said label and adjacent clusters are separated by a dividing line parallel to said second axis.

2. The method of claim 1 wherein said display comprises a graph of a symbol associated with said statistical parameters, said symbol located at a median value or an average value of said data set values.

3. The method of claim 1 wherein said data sets are further ordered within each cluster in said graph by said median value or said average value.

4. The method of claim 1 wherein said display comprises a graph of a symbol associated with said statistical parameters as a function of said label, said symbol located at a median value or average value of said plurality of measurements made by that test instrument.

5. The method of claim 4 wherein said symbol comprises a boxplot.

6. The method of claim 1 wherein each of said test instruments comprises a second test probe different from said first test probe and provides a measurement of a second physical quantity by said second test probe, and wherein said data processing system generates a plurality of statistical parameters that characterize a statistical distribution for a set of measurements corresponding to each of said plurality of test instruments and said second test probe associated with that test instrument and said instrument vectors further comprising said second plurality of statistical parameters.

7. A computer readable medium comprising instructions that cause a data processing system to execute a method that causes said data processing system to:
   receive a plurality of data sets, each data set comprising a plurality of measurements of a first physical quantity made by a corresponding test instrument, and a label identifying said test instrument, and being characterized by a statistical distribution;
   compute a plurality of statistical parameters for each of said plurality of data sets;

generate a data set vector having components equal to said plurality of statistical parameters for each of said plurality of data sets;

assign each data set to a cluster based on said data set vectors using a clustering algorithm; and generate a graph of said statistical distributions as a function of said labels on a display of said data processing system that is viewed by user to determine if systematic variations in said data sets are the result of variations in said test instruments or variations in components measured by said test instruments in which said statistical distributions belonging to the same cluster are grouped together along a first axis of said graph with said labels being shown on said first axis and said statistical distributions are displayed on a second axis of said graph, wherein each statistical distribution comprises a one-dimensional scatter plot of said measurement values of said dataset corresponding to said label and adjacent clusters are separated by a dividing line parallel to said second axis.

8. The computer readable medium of claim 7 wherein said display comprises a graph of a symbol associated with said statistical parameters, said symbol located at a median value or an average value of said data set values.

9. The computer readable medium of claim 7 wherein said data sets are further ordered within each cluster in said graph by said median value or said average value.

10. The computer readable medium of claim 7 wherein said display comprises a graph of a symbol associated with said statistical parameters as a function of said label, said symbol located at a median value or average value of plurality of said measurements made by that test instrument.

11. The computer readable medium of claim 10 wherein said symbol comprises a boxplot.

12. The computer readable medium of claim 7 wherein each of said test instruments comprises a second test probe different from said first test probe and provides a measurement of a second physical quantity by said second test probe, and wherein said data processing system generates a plurality of statistical parameters that characterize a statistical distribution for a set of measurements corresponding to each of said plurality of test instruments and said second test probe associated with that test instrument and said instrument vectors further comprising said second plurality of statistical parameters.

* * * * *